June 17, 1930.　　C. L. ROWLAND　　1,763,867
WELDING MACHINE
Filed Jan. 27, 1926　　6 Sheets-Sheet 5

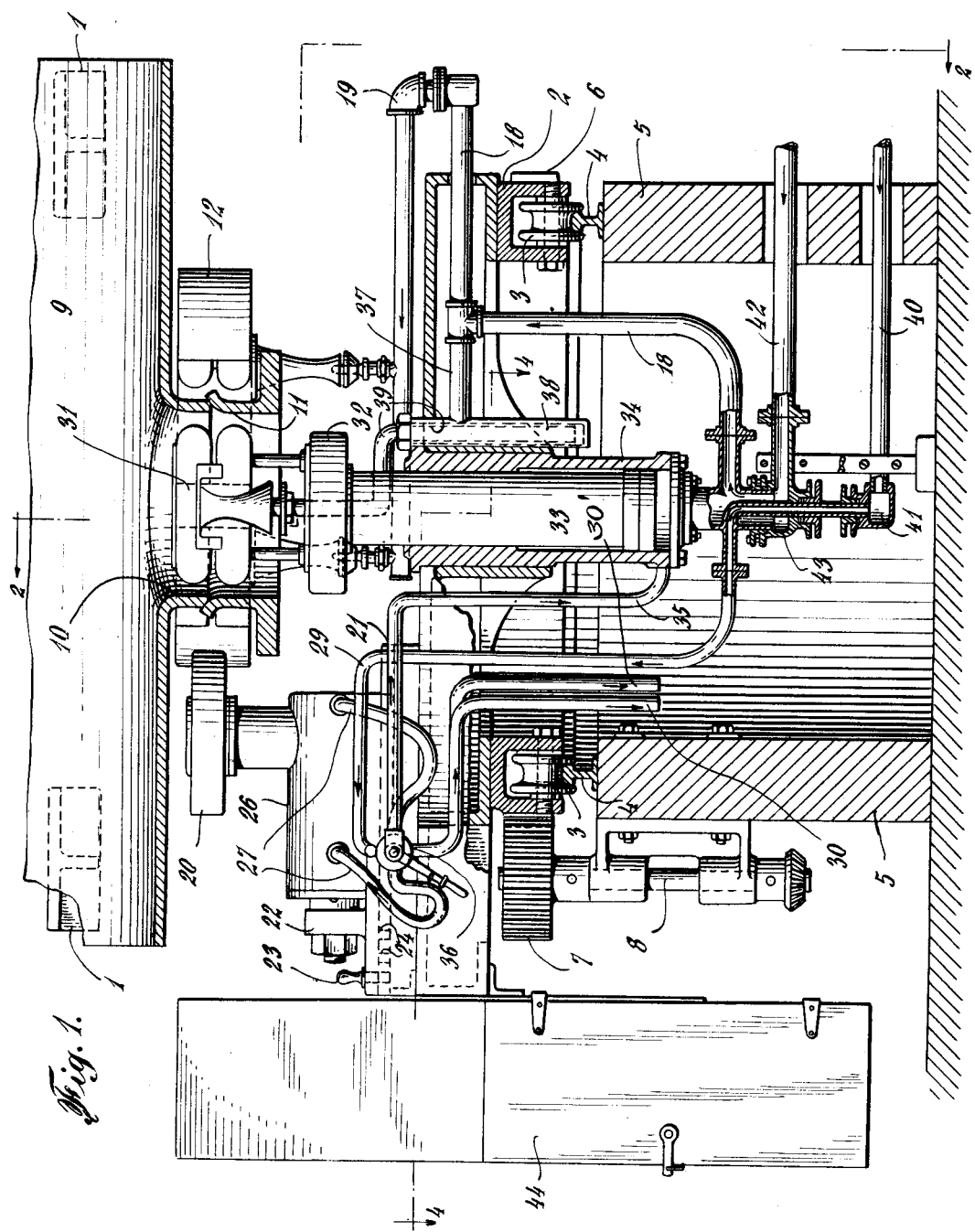

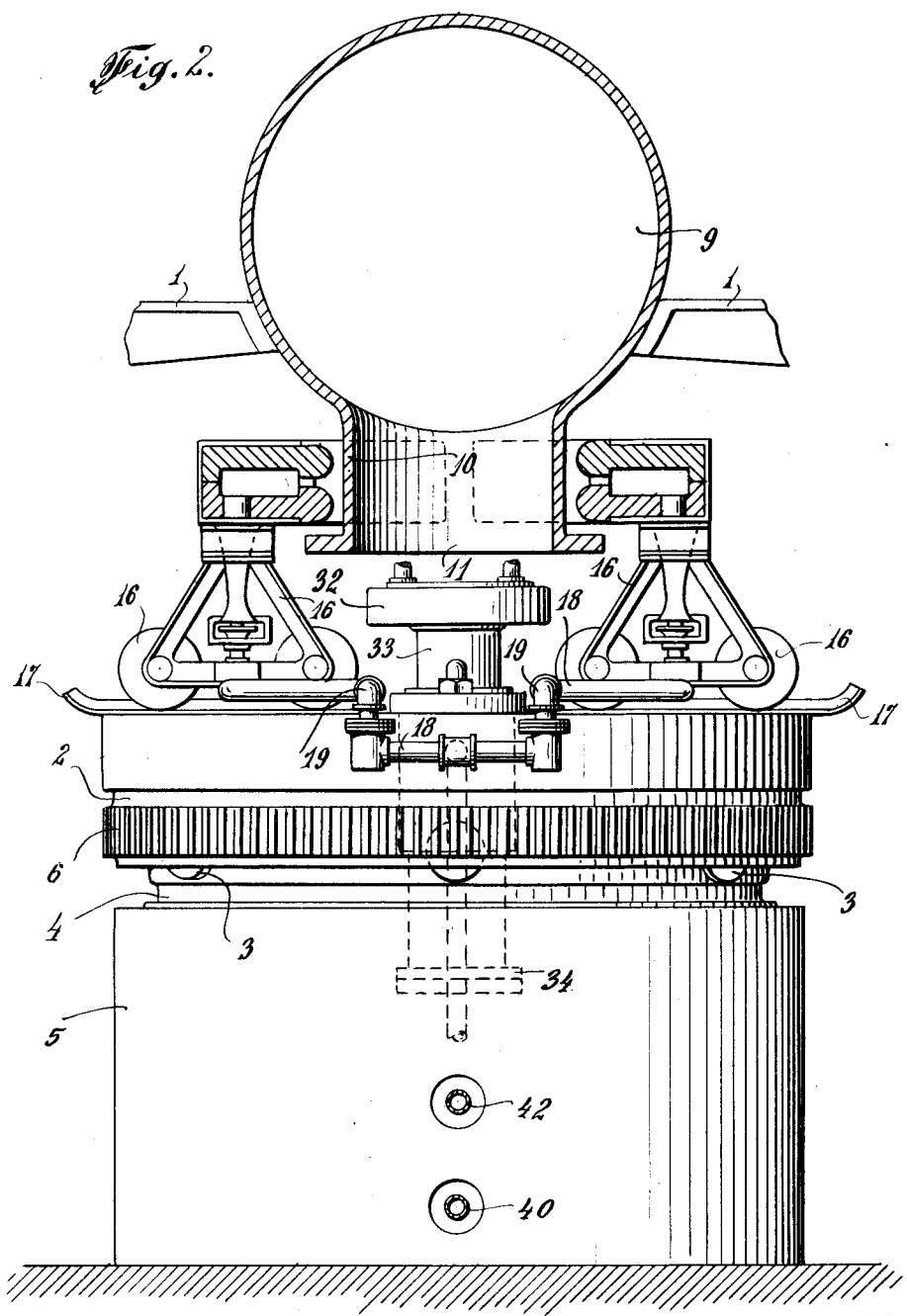

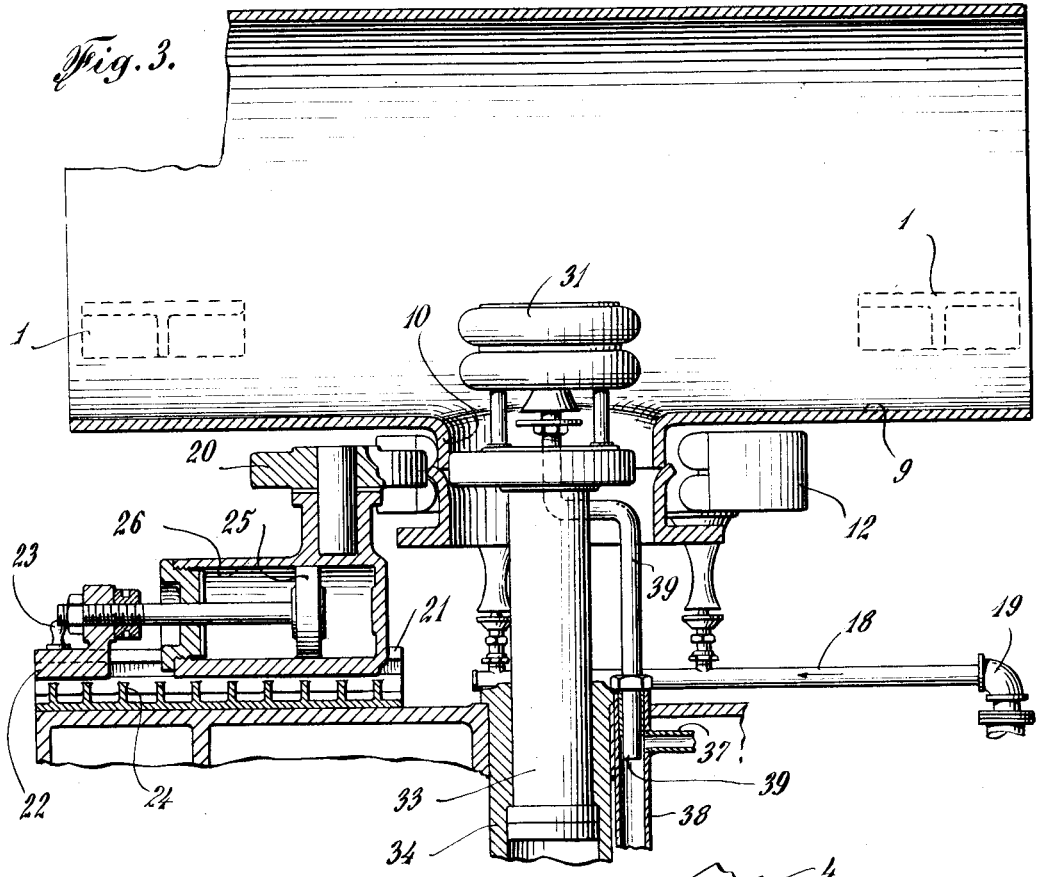
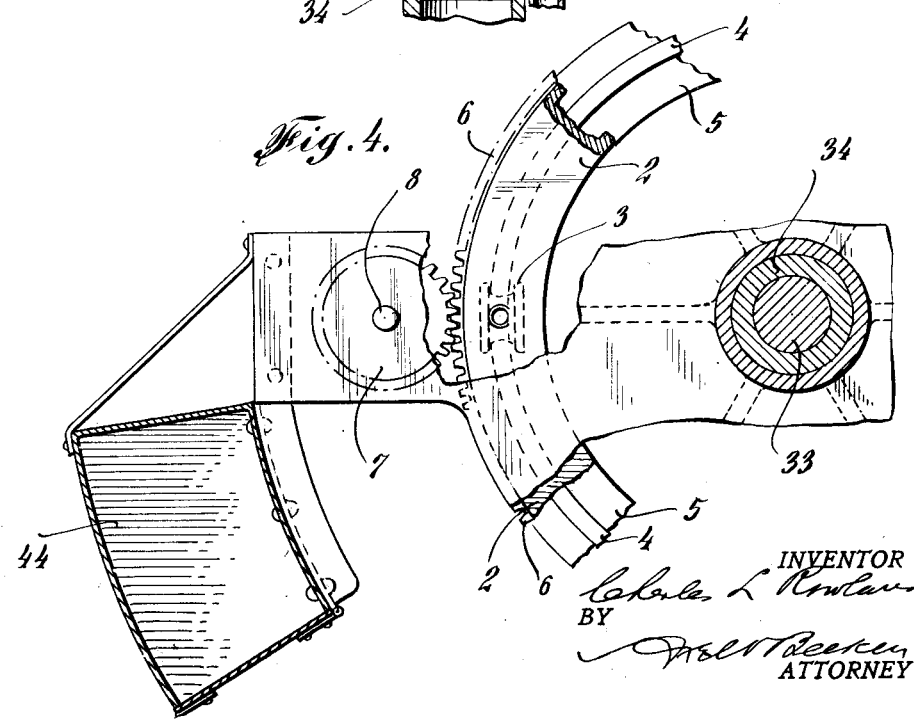

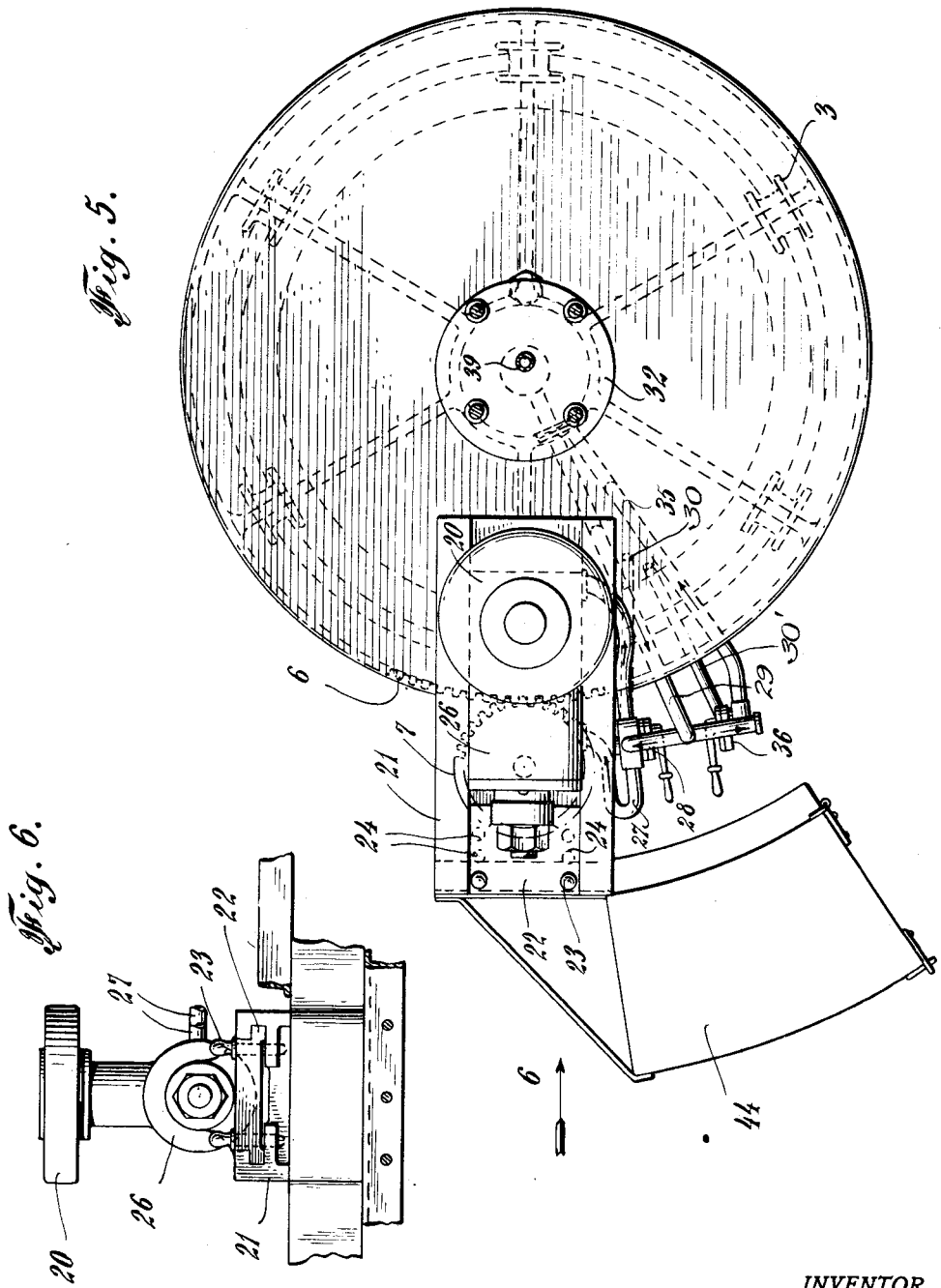

INVENTOR
Charles L. Rowland
BY
ATTORNEY

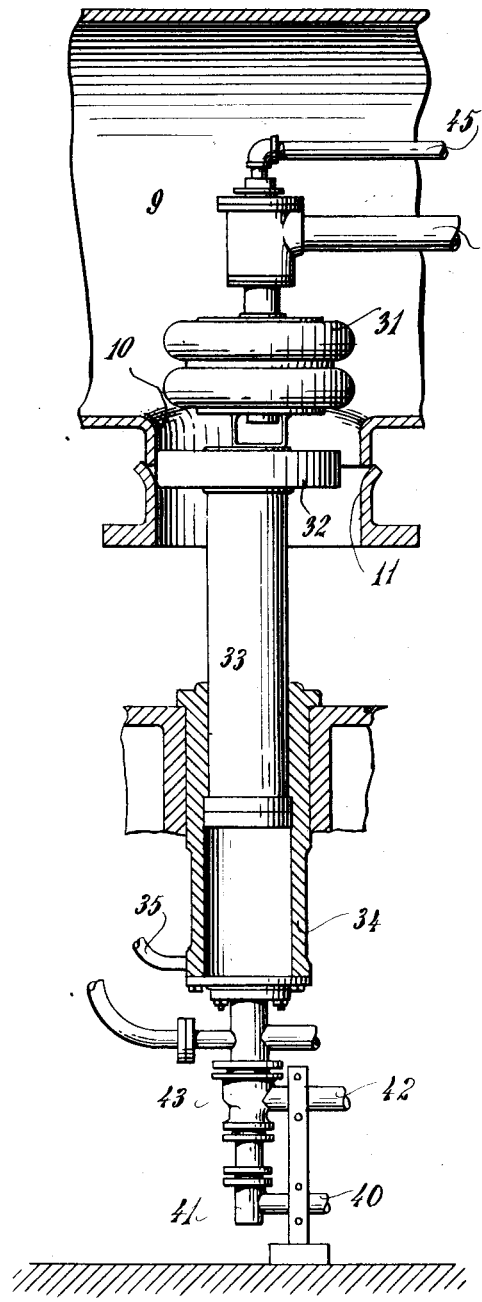
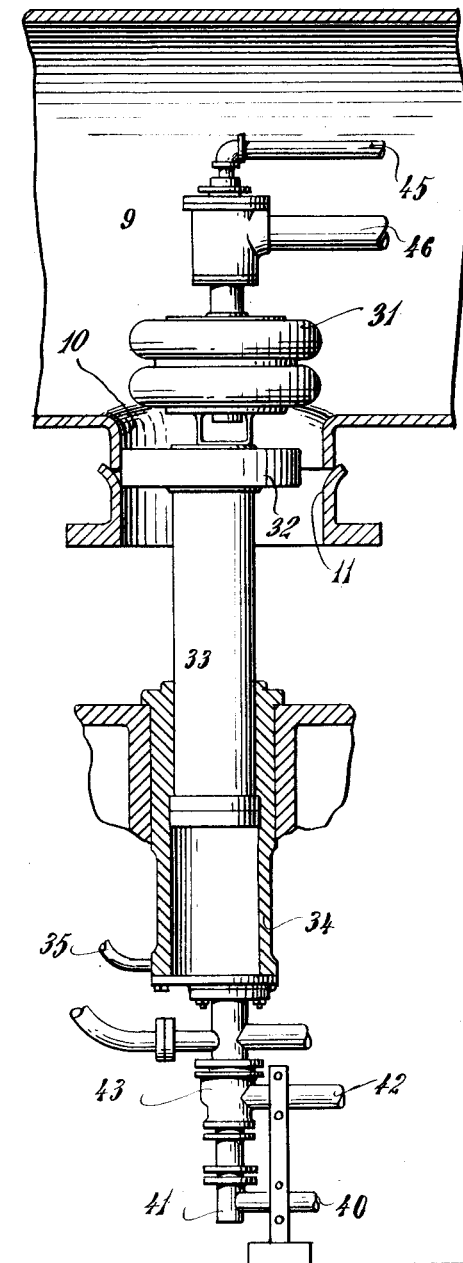

Patented June 17, 1930

1,763,867

UNITED STATES PATENT OFFICE

CHARLES L. ROWLAND, OF CARBONDALE, PENNSYLVANIA, ASSIGNOR TO AMERICAN WELDING COMPANY, OF CARBONDALE, PENNSYLVANIA, A CORPORATION OF PENNSYLVANIA

WELDING MACHINE

Application filed January 27, 1926. Serial No. 84,134.

This invention relates to welding machines and has for its main object and feature the production of means for welding a branch or neck at an angle to a pipe or tank, it being understood, however, that, while the form of the invention shown in the drawings is particularly adapted for work of this character, the invention itself is capable of use in many other fields.

In the accompanying drawings the invention is disclosed in several concrete and preferred forms in which Fig. 1 is a vertical sectional view through a machine embodying one form of the invention.

Fig. 2 is a vertical sectional view substantially on the plane of line 2—2 of Fig. 1.

Fig. 3 is a fragmentary view of some of the parts shown in Fig. 1, but with the elements in a different position.

Fig. 4 is a horizontal sectional fragmentary view substantially on the plane of line 4—4 of Fig. 1.

Fig. 5 is a top plan view of the device with the furnace equipment removed.

Fig. 6 is a detail view looking in the direction of arrow 6 of Fig. 5.

Figs. 9 and 10 are fragmentary vertical sectional views through the center of the device showing modified forms of the invention.

Figure 7:
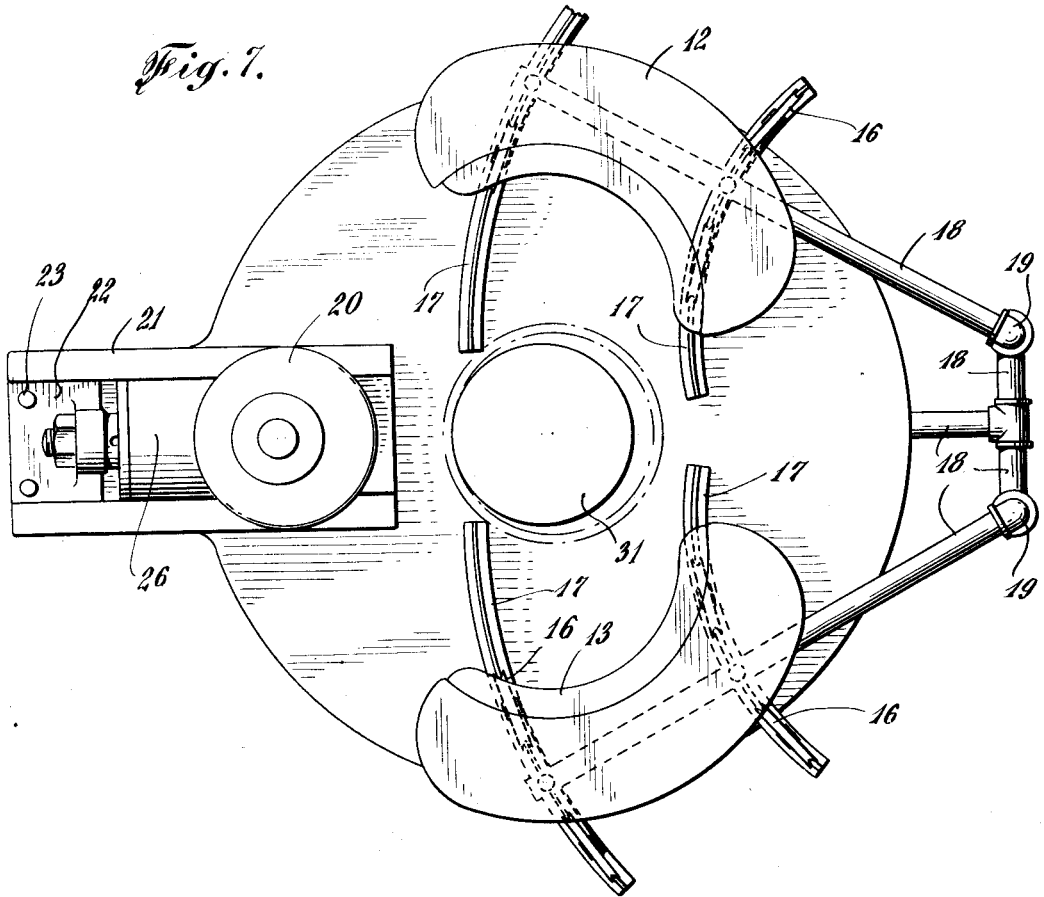
Figs. 7 and 8 are somewhat diagrammatic plan views showing the exterior furnace equipment in different positions.

1 indicates a work holder and 2 is a carrier for the furnace equipment and welding means. The work holder and carrier are given a relative rotating movement one with relation to the other, and it will be understood that such relative movement may be obtained by rotating either or both. In the present instance the work holder is stationary and the carrier is a rotatable turret provided with rollers 3 traveling on circular track 4 suitably supported by base 5. Motion may be imparted to this turret by any suitable means such as: gear ring 6, pinion 7 and shaft 8 actuated by a motor or otherwise.

The work on which the machine is capable of acting and here selected for illustration is a tank 9 having an upset portion 10 to which a hollow branch or neck 11 is to be welded, and while such branch may have any cross section it is shown here as of circular form. In the present instance both the interior and exterior surfaces of the work have welding heat and pressure applied to them.

Figure 8:
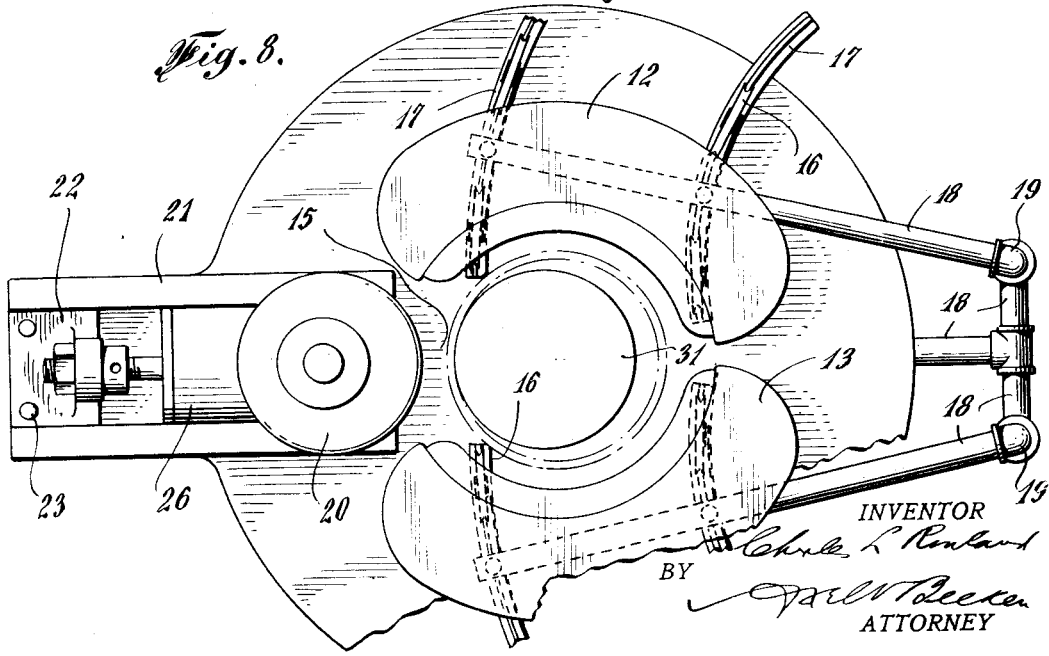

Suitable exterior furnace equipment is provided, which may, under certain conditions, be traveling furnaces of the usual kind and not mounted on turret 2, but in the present instance there are a number of furnaces, here two in number, 12 and 13 which are preferably segmental shape and which when in heat applying position (Fig. 8) surround the work leaving an intervening gap as at 15. Said furnaces are mounted on carriages 16 that travel on curved tracks 17 on carrier or turret 2. Suitable fuel connections such as for gas are shown at 18 and these connections are flexible or have a joint as at 19 so that the furnaces may be moved over tracks 17 without disconnecting the fuel supply. In the plane of gap 15 is an exterior welding member or roll 20 and this member is movable toward and away from the work. Inasmuch as member 20, like furnaces 12 and 13, is carried by 2 it will be understood that the work has heat and pressure applied to it circumferentially as a substantially continuous process. Welding member 20 may take many forms, but, as here shown it is constructed as follows: 21 indicates a guide for the reception of slide 22 and this slide may be adjusted to different positions in accordance with different diameters of work and when so adjusted pins 23 may be placed in openings 24 to retain it in position. Slide 22 carries a piston 25 which is stationary with member 22 and on which slides cylinder 26 carrying roll 20. By admitting fluid pressure, such as water, oil or gas, alternately to opposite sides of piston 25 it will be understood that roll 20 will be moved toward and away from the work. Flexible connections 27 and a valve 28 are used to alternately connect opposite sides of the cylinder with intake pipe 29 and exhaust 30.

Suitable means to apply heat and pressure to the interior surface of the work are utilized, and it will be understood that a traveling furnace, of known construction, may be brought into play, but in the present instance it is preferred to mount the interior furnace equipment and welding member on the same member. As shown in the drawings, interior furnace 31 and interior welding roll 32 are both mounted on member 33, here in the form of a plunger, and it will be seen that the furnace and roll are mounted in tandem so to speak. Plunger 33 slides in cylinder 34 carried by turret 2 substantially at its center of rotation and fluid pressure may conveniently be used to lift the plunger so as to move roll 32 with the work and when fluid pressure is released gravity causes the descent of said plunger. At 35 is shown a fluid pressure connection controlled by valve 36 so that fluid may be admitted from pipe 29 or directed to an exhaust 30' at will; the valve 36 controlling the simultaneous admission of fluid through pipes 27 and 35 whereby the welding members 20 and 32 are simultaneously actuated into welding position. The fuel for the interior furnace may be taken from fuel connection 18 by means of a branch 37 leading to cylinder 38 into which is telescoped pipe 39 leading to interior furnace 31. It is important that the heat should be applied to the interior surface of the work substantially equaly, but it will also be understood that welding roll 32 must contact with the work at only one point, viz: in the plane of gap 15 and thus opposite to point of engagement of roll 20. Roll 32 is therefore eccentrically disposed with respect to the work and this may be done by mounting said roll eccentrically with respect to the center of rotation of carrier 2. Furnace 31, as previously indicated, need not be carried by roll 32 and need not rotate, but if carried by roll 32 it is preferably concentrically disposed with respect to the interior surface of the work so as to apply the heat equally on all sides.

The fuel and fluid pressure may conveniently be brought into the apparatus by the following means. Water pipe 40 extends to distributor head 41 in which pipe 29 turns as carrier 2 rotates. Similarly gas pipe 42 leads to a second distributor head 43, through which 29 extends, and with which gas pipe 18 communicates. Thus pipes 18 and 29 are free to rotate with the turret without interrupting the fluid connections.

44 is an operator's cage mounted to rotate with turret 2 and from which valves 28 and 36 are accessible.

It is thought unnecessary to describe the detailed construction of the furnaces, suffice it to say that in the present case, they contain suitable means for mixing air and gas.

In Figs. 9 and 10 are shown modified forms of the invention. In Fig. 9 member roll 32 is concentric with member 33, but is still eccentric with relation to the work, and furnace 31 is eccentric with respect to 33 but concentric with respect to the work. In this case also furnace 31 has fuel fed to it from the top through pipes 45 and 46 and it will be understood that these pipes may be flexible or that suitable joints are formed in the connections in case the furnace revolves. In Fig. 10 substantially the same construction as is shown in Fig. 9 is disclosed, the only difference being that the distributor heads are offset with respect to member 33 and are in line with furnace 31.

The operation of the device is as follows: The work to be acted upon is placed in position on the work holder and neck 11 is temporarily supported on 10 in a manner well-understood. Welding members 20 and 32 are withdrawn and the exterior and interior furnaces are ignited and placed in position. Rotation is now imparted to carrier 2 and the furnaces are caused to rotate. This continues until a welding heat is obtained when plunger 33 is raised thereby bringing roll 32 into action and at the same time roll 20 is advanced toward the work. The rolling and heating action continues until a weld has been made. The rollers are then withdrawn and the furnaces are extinguished, rotation is stopped and the exterior furnaces are swung out of the way.

I claim:

1. A welding machine including: a work holder, an exterior furnace equipment surrounding the work and having a gap affording access to the work, a welding member to act on the work in the plane of the gap, and transmission devices to effect a rotating movement of the exterior furnace equipment and welding member with respect to the work holder.

2. A welding machine including: a work holder, an exterior furnace equipment surrounding the work and having a gap affording access to the work, a welding member to act on the work in the plane of the gap, transmission devices to effect a rotating movement of the exterior furnace equipment and welding member with respect to the work holder and means for moving the welding member toward and away from the work.

3. A welding machine including: a work holder to support hollow work, an exterior furnace equipment surrounding the work and having a gap affording access to the work, an exterior welding member to act on the work in the plane of the gap, an interior furnace equipment within the work, an interior welding member also within the work, transmission devices to effect with respect to the exterior furnace equipment and the welding members as one element and the work holder as another element, a relative rotating movement one with relation to the other and means for moving the interior furnace equipment and interior welding member lengthwise of the work to bring said interior welding member into and out of engagement with the work.

4. A welding machine including: a work holder to support hollow work, an exterior furnace equipment surrounding the work and having a gap affording access to the work, an exterior welding member to act on the work in the plane of the gap, an interior furnace equipment within the work, an interior welding member also within the work, transmission devices to effect with respect to the furnace equipments and the welding members as one element and the work holder as another element, a relative rotating movement one with relation to the other and means for moving the interior furnace equipment and interior welding member lengthwise of the work to bring said interior welding member into and out of engagement with the work.

5. A welding machine including: a work holder to support hollow work, an exterior furnace equipment surrounding the work and having a gap affording access to the work, an exterior welding member to act on the work in the plane of the gap, an interior furnace equipment within the work, an interior welding member also within the work, transmission devices to effect with respect to the exterior furnace equipment and the welding members as one element and the work holder as another element, a relative rotating movement one with relation to the other, means for moving the interior furnace equipment and interior welding member lengthwise of the work to bring said interior welding member into and out of engagement with the work and means for moving the exterior welding member toward and away from the work.

6. A welding machine including: a work holder to support hollow work, an exterior furnace equipment surrounding the work and having a gap affording access to the work, an exterior welding member to act on the work in the plane of the gap, an interior furnace equipment within the work, an interior welding member also within the work, transmission devices to effect with respect to the furnace equipments and the welding members as one element and the work holder as another element, a relative rotating movement one with relation to the other, means for moving the interior furnace equipment and interior welding member lengthwise of the work to bring said interior welding member into and out of engagement with the work and means for moving the exterior welding member toward and away from the work.

7. A welding machine including: a work holder, a carrier adjacent the work holder, curved tracks on said carrier, segmental-shape furnaces movable on said tracks to encircle the work with an intervening gap, and a welding member on the carrier movable toward and away from the work in the plane of the gap.

8. A welding machine including: a work holder, a carrier adjacent the work holder, curved tracks on said carrier, segmental-shape furnaces movable on said tracks to encircle the work with an intervening gap, and a welding member on the carrier movable in a straight line toward and away from the work in the plane of the gap.

9. A welding machine including: a work holder to support hollow work, an interior furnace within the work to apply heat substantially uniformly to the interior surface of the work, a welding member eccentrically disposed with respect to the interior surface of the work, and means for effecting relative rotation between the work holder and the welding member, one with relation to the other.

10. A welding machine including: a work holder to support hollow work, an interior furnace within the work to apply heat substantially uniformly to the interior surface of the work, a welding member eccentrically disposed with respect to the interior surface of the work, and means for effecting rotation of the interior welding member with relation to the work.

11. A welding machine including: a work holder to support hollow work, an interior furnace within the work to apply heat substantially uniformly to the interior surface of the work, a welding member eccentrically disposed with respect to the interior surface of the work, and means for effecting rotation of the interior furnace and welding member with relation to the work.

12. A welding machine including: a work holder to support hollow work, an interior furnace within the work to apply heat substantially uniformly to the interior surface of the work, a welding member eccentrically disposed with respect to the interior surface of the work, a member movable lengthwise of the work and carrying the furnace and welding member in tandem, and means to move the movable member to bring the welding member into and out of contact with the work.

13. A welding machine including: a work holder to support hollow work, an interior furnace within the work to apply heat substantially uniformly to the interior surface of the work, a welding member eccentrically disposed with respect to the interior surface of the work, a member movable lengthwise of the work and carrying the furnace and welding member in tandem, and fluid pressure means to move the movable member to bring the welding member into and out of contact with the work.

14. A welding machine including: a work holder to support hollow work, an interior furnace within the work to apply heat substantially uniformly to the interior surface of the work, a welding member eccentrically disposed with respect to the interior surface of the work, means for effecting relative rotation between the work holder and the welding member, one with relation to the other, a member movable lengthwise of the work and carrying the furnace and welding member in tandem, and means to move the movable member to bring the welding member into and out of contact with the work.

15. A welding machine including: a work holder to support hollow work, an interior furnace within the work to apply heat substantially uniformly to the interior surface of the work, a welding member eccentrically disposed with respect to the interior surface of the work, means for effecting relative rotation between the work holder and the welding member, one with relation to the other, a member movable lengthwise of the work and carrying the furnace and welding member in tandem, and fluid pressure means to move the movable member to bring the welding member into and out of contact with the work.

16. A welding machine including: a work holder to support hollow work, an interior furnace within the work to apply heat substantially uniformly to the interior surface of the work, a welding member eccentrically disposed with respect to the interior surface of the work, means for effecting rotation of the interior welding member with relation to the work, a member movable lengthwise of the work and carrying the furnace and welding member in tandem, and means to move the movable member to bring the welding member into and out of contact with the work.

17. A welding machine including: a work holder to support hollow work, an interior furnace within the work to apply heat substantially uniformly to the interior surface of the work, a welding member eccentrically disposed with respect to the interior surface of the work, means for effecting rotation of the interior welding member with relation to the work, a member movable lengthwise of the work and carrying the furnace and welding member in tandem, and fluid pressure means to move the movable member to bring the welding member into and out of contact with the work.

18. A welding machine including: a work holder to support hollow work, an interior furnace within the work to apply heat substantially uniformly to the interior surface of the work, a welding member eccentrically disposed with respect to the interior surface of the work, means for effecting rotation of the interior furnace and welding member with relation to the work, a member movable lengthwise of the work and carrying the furnace and welding member in tandem, and means to move the movable member to bring the welding member into and out of contact with the work.

19. A welding machine including: a work holder to support hollow work, an interior furnace within the work to apply heat substantially uniformly to the interior surface of the work, a welding member eccentrically disposed with respect to the interior surface of the work, means for effecting rotation of the interior furnace and welding member with relation to the work, a member movable lengthwise of the work and carrying the furnace and welding member in tandem, and fluid pressure means to move the movable member to bring the welding member into and out of contact with the work.

20. A welding machine including: a work holder, a rotatable turret adjacent thereto, furnace equipment and welding means, fluid pressure actuated means to move the welding means and fuel connections for the furnace equipment all carried by the turret, and extraneous sources of supply of fluid pressure and of fuel connected with the turret at its center of rotation.

21. A welding machine including: a work holder, a rotatable turret adjacent thereto, furnace equipment and welding means, fluid pressure actuated means to move the welding means and fuel connections for the furnace equipment all carried by the turret, extraneous sources of supply of fluid pressure and of fuel connected with the turret at its center of rotation, an operator's cage carried by the turret, and controlling means for the fluid pressure flow adjacent the operator's cage.

22. A welding machine including: a work holder to support hollow work, a rotatable turret horizontally disposed, a vertically disposed cylinder substantially at the center of rotation of the turret, a vertically movable plunger in said cylinder, a welding member and a furnace carried in tandem at the upper end of said plunger to act on the interior surface of the work, and furnace equipment and welding means carried by said turret to act on the exterior surface of the work.

23. A welding machine including: a work holder to support hollow work, a rotatable turret horizontally disposed, a vertically disposed cylinder substantially at the center of rotation of the turret, a vertically movable plunger in said cylinder, a welding member and a furnace carried in tandem at the upper end of said plunger to act on the interior surface of the work, and furnace equipment and welding means carried by said turret and horizontally movable thereon to act on the exterior surface of the work.

24. A welding machine including: a work holder to support hollow work, a rotatable turret horizontally disposed, a vertically disposed cylinder substantially at the center of rotation of the turret, a vertically movable plunger in said cylinder, a welding member and a furnace carried in tandem at the upper end of said plunger to act on the interior surface of the work, segmental-shape furnaces horizontally adjustable on the turret to surround the work with an intervening gap, a second welding member on the turret to act on the exterior of the work in the plane of the gap, and fluid pressure means to move said second welding member horizontally on the turret in the plane of the gap.

25. A welding machine including: a work holder to support hollow work, exterior furnace equipment to surround the work with an intervening gap, an exterior welding member, to engage the exterior of the work, located in the plane of the gap, an interior welding member, to engage the interior of the work, also located in the plane of the gap, and transmission devices to effect rotation of the exterior furnace equipment and welding members with relation to the work holder.

26. A welding machine including: a work holder to support hollow work, exterior furnace equipment to surround the work with an intervening gap, an exterior welding member, to engage the exterior of the work, located in the plane of the gap, an interior welding member, to engage the interior of the work, also located in the plane of the gap, transmission devices to effect, with respect to the exterior furnace equipment and welding members as one element and the work holder as another element, a relative rotating movement one with relation to the other, and interior furnace equipment supported by the interior welding member for applying heat to the interior of the work prior to the welding action of the interior welding member.

27. A welding machine including: a work holder to support hollow work, exterior furnace equipment to surround the work with an intervening gap, an exterior welding member, to engage the exterior of the work, located in the plane of the gap, an interior welding member, to engage the interior of the work, also located in the plane of the gap, transmission devices to effect rotation of the exterior furnace equipment and welding members with relation to the work holder, and interior furnace equipment to apply heat to the interior of the work.

28. A welding machine including: a work holder to support hollow work, exterior furnace equipment to surround the work with an intervening gap, an exterior welding member, to engage the exterior of the work, located in the plane of the gap, an interior welding member, to engage the interior of the work, also located in the plane of the gap, transmission devices to effect, with respect to the exterior furnace equipment and welding members as one element and the work holder as another element, a relative rotating movement one with relation to the other, and means for simultaneously moving the exterior welding member toward and from the work and the interior welding member within and without the work.

29. A welding machine including: a work holder to support hollow work, exterior furnace equipment to surround the work with an intervening gap, an exterior welding member, to engage the exterior of the work, located in the plane of the gap, an interior welding member, to engage the interior of the work, also located in the plane of the gap, transmission devices to effect rotation of the exterior furnace equipment and welding members with relation to the work holder, fluid pressure means to move the exterior welding member toward and from the work and the interior welding member within and without the work rotatable with the welding members, and an extraneous source of supply of fluid pressure flexibly connected with the fluid pressure means.

30. In a machine of the character described having a work holder, a plurality of welding members and furnace equipments rotatable relative to the work holder, one of said furnace equipments and welding members being also vertically movable whereby to place said welding member in operative compressing position with respect to the work.

31. In a machine of the character described having a work holder, a plurality of welding members normally out of engagement with the work and a plurality of furnace equipments normally in heating position with respect to the work, means for rotating said furnace equipments and welding members, and means for bringing the welding members into welding position with respect to the work during the rotation of the furnace equipments.

32. In a machine of the character described having a work holder, a plurality of welding members normally out of engagement with the work and a plurality of furnace equipments normally in heating position with respect to the work, means for rotating said furnace equipments and welding members, and means for bringing the welding members into welding position with respect to the work during the rotation of said welding members and furnace equipments.

33. In a machine of the character described having a work holder, a rotatable turret, a furnace equipment mounted on the turret, a welding member mounted on the turret, a second welding member carried by the turret and supporting a furnace equipment, and fluid actuated means to move said welding members to operative position.

34. In a machine of the character described having a work holder, a rotatable turret, a furnace equipment mounted on the turret, a welding member mounted on the turret, a second welding member carried by the turret and supporting a furnace equipment, and fluid actuating means for moving one of said welding members laterally and the other member vertically with respect to the turret whereby to place said members in welding position.

35. A machine of the kind described comprising: a work holder, a rotatable turret, furnaces carried thereby and having a gap therebetween, a welding member operable against the work in the plane of the gap, a second welding member secured to the turret and rotatable therewith and vertically movable with respect thereto, and a furnace equipment carried by said second welding member and normally positioned within the work.

36. A welding machine comprising a stationary work holder, a rotatable furnace equipment surrounding the work, a rotatable furnace equipment adjustably supported within the work, and interior and exterior welding members rotatable with the furnace equipments for acting on the work at the place of weld.

37. A welding machine comprising a stationary work holder, a furnace equipment surrounding the work, a second furnace equipment arranged within the work and longitudinally adjustable therein, a turret on which said equipments are mounted, a welding member carried by the turret and adjustable thereon to contact with the work at the place of weld, a second welding member carried by the second furnace equipment and adapted to act on the work in opposed relation to said first named welding member, and means for rotating the turret to cause rotation of the furnace equipments and welding members with respect to the work.

38. A welding machine comprising a stationary work holder, a furnace equipment surrounding the work, a second furnace equipment arranged within the work and longitudinally adjustable therein, a turret on which said equipments are mounted, a welding member carried by the turret and adjustable thereon to contact with the work at the place of weld, a second welding member carried by the second furnace equipment and adapted to act on the work in opposed relation to said first named welding member, and means for rotating the turret to cause rotation of the furnace equipments and welding members with respect to the work.

Signed at New York, in the county of New York and State of New York, this 26th day of January, 1926.

CHARLES L. ROWLAND.

CERTIFICATE OF CORRECTION.

Patent No. 1,763,867. June 17, 1930.

CHARLES L. ROWLAND.

It is hereby certified that the above numbered patent was erroneously issued to "American Welding Company, of Carbondale, Pennsylvania, a corporation of Pennsylvania" whereas said patent should have been issued to Shippers' Car Line Corporation, as assignee by mesne assignments of the entire interest in said invention as shown by the records of assignments in this office; and that the said Letters Patent should be read with this correction therein that the same may conform to the record of the case in the Patent Office.

Signed and sealed this 2nd day of October, A. D. 1934.

Leslie Frazer (Seal) Acting Commissioner of Patents.